A. GENTON.
LOOSE WHEEL MOUNT.
APPLICATION FILED SEPT. 29, 1919.
1,379,860.
Patented May 31, 1921.
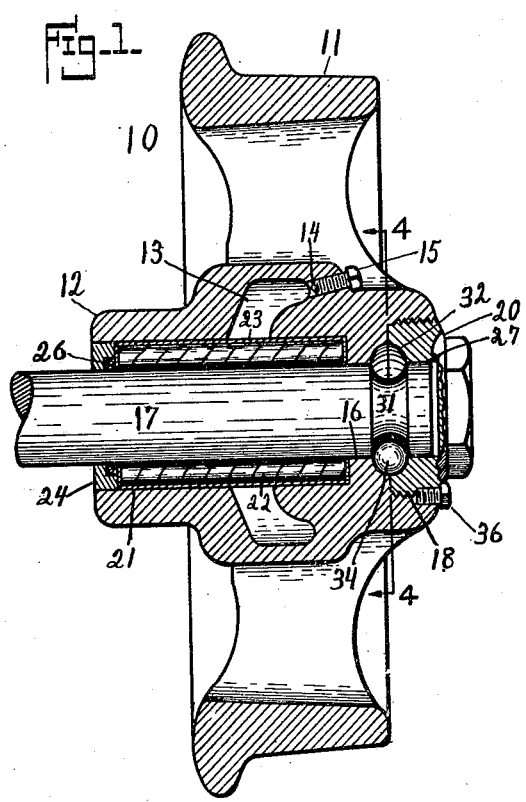
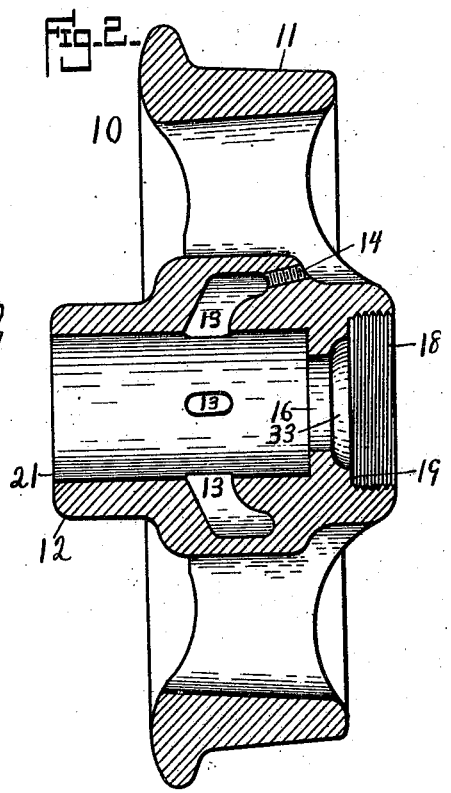
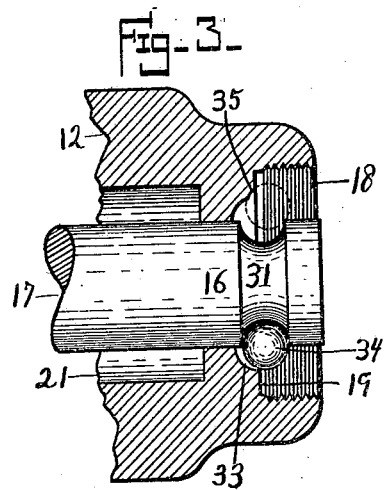
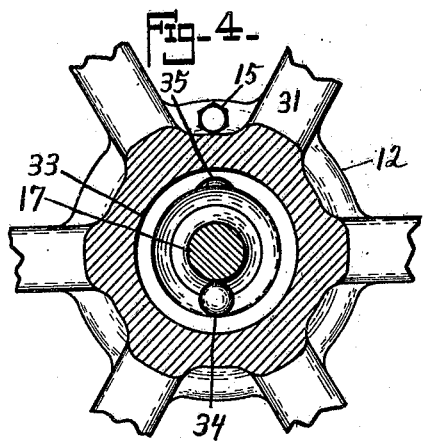
INVENTOR
Aime Genton
BY W.B.Munnell
ATTORNEY

UNITED STATES PATENT OFFICE.

AIME GENTON, OF LOUISVILLE, KENTUCKY, ASSIGNOR OF ONE-THIRD TO ROBERT L. SCHMITT, OF LOUISVILLE, KENTUCKY.

LOOSE WHEEL-MOUNT.

1,379,860. Specification of Letters Patent. Patented May 31, 1921.

Application filed September 29, 1919. Serial No. 327,140.

*To all whom it may concern:*

Be it known that I, AIME GENTON, a citizen of the United States, and residing in the city of Louisville, county of Jefferson, and State of Kentucky, have invented a new and useful Improvement in Loose Wheel-Mounts, of which the following is a specification.

This invention relates to means for mounting a wheel loosely upon a fixed axle, and is more particularly designed for use in connection with mine cars, although it may be applied to any class of vehicles in which wheels rotating on fixed axles are employed.

An object of the invention is to provide means of securing a wheel upon a fixed axle with a minimum of friction between the wheel, axle and fastening.

A further object is to provide a simple construction having a minimum number of parts and which can be readily assembled or separated.

With the foregoing and other objects in view, the invention consists of the novel construction and arrangement of parts illustrated in the accompanying drawing, which forms a part of this specification, wherein is set forth an embodiment of the invention, but it is to be understood that such changes and modifications may be resorted to as come within the scope of the claim appended hereunto.

In the drawing wherein similar reference characters designate like parts in the several views, Figure 1, is a central vertical longitudinal section of an embodiment of the invention; Fig. 2, a central vertical section of a wheel; Fig. 3, a detail showing method of placing a ball in position; and Fig. 4, a section on line 4—4 of Fig. 1.

Referring now in detail to the drawing, the reference numeral —10— designates a wheel, the rim —11— and hub —12— of which are cast integral. The hub is provided with chambers —13— for the reception of a lubricant which may be introduced through an opening —14— which is closed by means of a screw-plug —15—.

The hub is provided centrally with a bore —16— for the reception of a shaft —17—, and on the outer end it is provided with a counter bore —18— for the reception of a cap —20—. The hub is also counterbored from the inner end for a spaced distance (the greater portion of its length) to provide for the reception of roller bearings —22— which fit about the axle. Roller bearings are articles of commerce, and any one of many well known makes may be used, consequently it is not thought necessary to describe them. Bearings such as illustrated come assembled in a sleeve —23—, and it is only needed to slip the assembly into the counter bore in the hub. After the bearing is inserted a ring —24— preferably of bronze, or other bearing metal, is fitted tightly in the end of the counterbore to retain the bearing. The inner edge of the retaining ring is provided with a rabbit for the reception of a washer —26—, of felt or other suitable material, which will fit closely about the axle and exclude dirt and dust. The cap, 20, is provided with a bore on its inner face adapted to receive the end of the axle. The axle is provided at a spaced distance from its end with a circumferential groove —31—, which when the wheel is on the axle coincides with the meeting line of the inner end of the cap with a shoulder —19— forming the bottom of the counterbore 18. A groove, complementary to the groove 31, is formed jointly in the cap and in the shoulder 19, one half —32— being in the cap and the other half —33— in the shoulder. The grooves 31, 32 and 33, as an entirety forming a raceway for a ball —34—, which lying half in the axle and half in the hub, the cap being to all intent solid with the hub, effectively prevents any longitudinal movement of the wheel on the axle. One ball is sufficient to retain the wheel in position, as it is doubtful if any stress would ever be exerted great enough to shear the ball, as would be necessary to enable the wheel to come off, but more balls may be used if desired. To place a ball in position the wheel is placed on the axle and pushed back thereon until the groove, 31, therein is slightly in advance of the groove, 32, in the shoulder 19, the ball may then be dropped into the groove 31, a notch —35— in the edge of groove 33 permitting the ball to pass, the position of a ball so entering is shown in dotted lines in Fig. 3. On entering the groove the ball will roll to the under side but can not escape. The wheel may now be drawn forward until the ball checks it, when the grooves 31 and 33 register. The cap is then placed in the counterbore so that the groove 32, in its inner edge will register with the other components of the raceway, and secured. As illustrated the counterbore and the cap are provided respectively with interengaging screw threads, and a lock screw —36— is employed to prevent loosening of the cap by vibration. It is evident however that other means may be utilized to secure the cap in position.

Having thus described the invention so that any one skilled in the art pertaining thereto can make and use the same.

I claim:—

In a loose wheel mount, an axle having a circumferential groove a spaced distance from an end thereof, a wheel having a hub, said hub having a central bore adapted to receive said axle, the hub being counterbored forming a shoulder, a cap adapted to fit in said counterbore and seat on said shoulder, said cap having a bore to receive the end of the axle, the abutting edges of the cap and the shoulder respectively being provided with grooves which register with the groove in the axle and form a raceway, and a ball positioned in said raceway, said counterbore being of sufficient diameter to permit insertion of said ball laterally.

AIME GENTON.